June 11, 1957  A. L. VANDERGRIFF ET AL  2,795,011
APPARATUS FOR EXTRACTING STICKS, STEMS, BURRS AND
OTHER TRASH FROM SEED COTTON
Filed Jan. 19, 1955  2 Sheets-Sheet 1
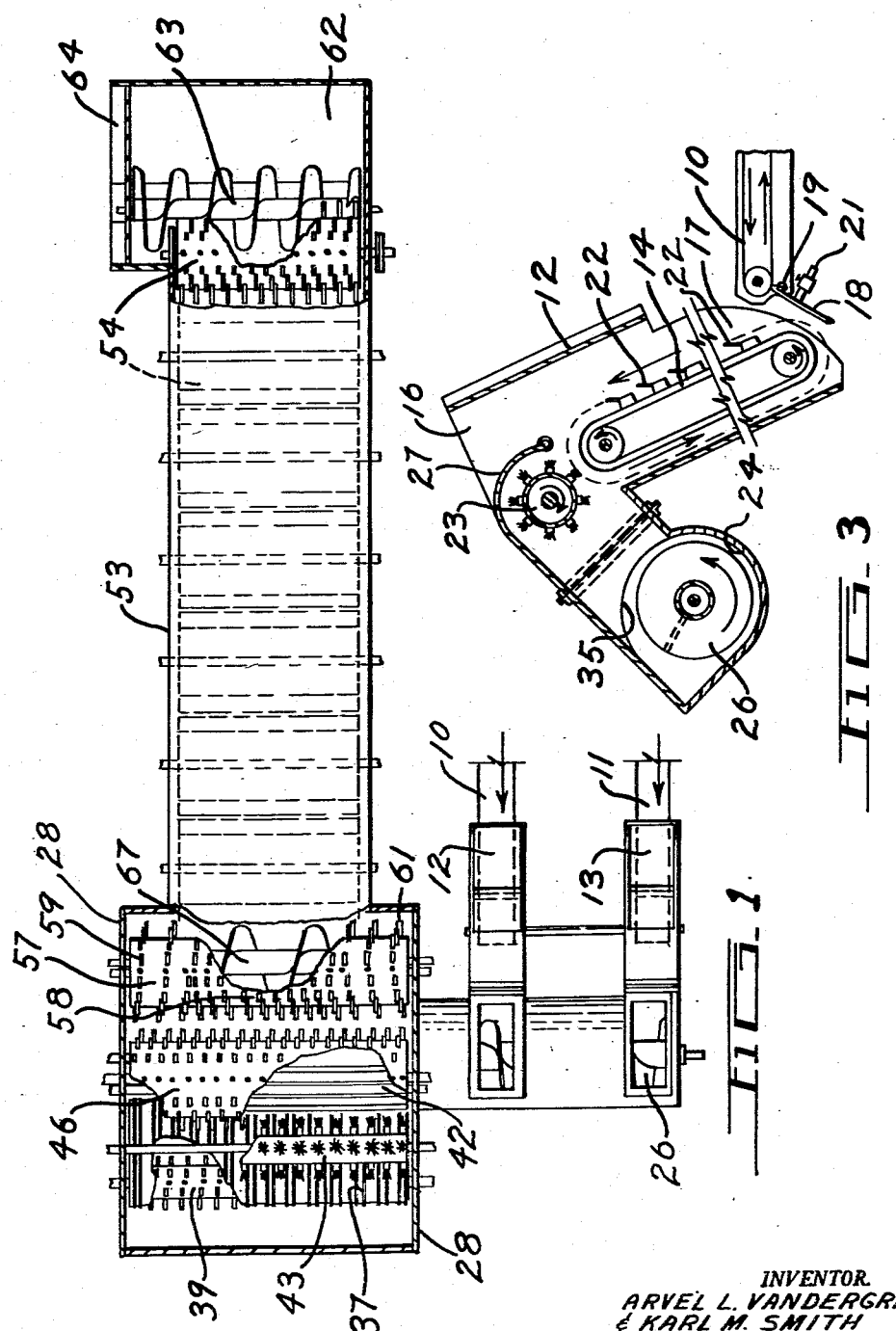
INVENTOR.
ARVEL L. VANDERGRIFF
& KARL M. SMITH
BY
ATTORNEYS

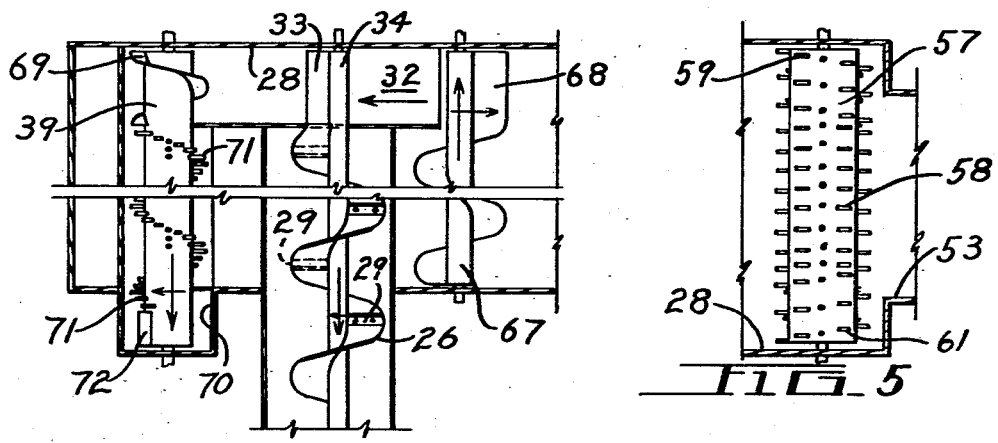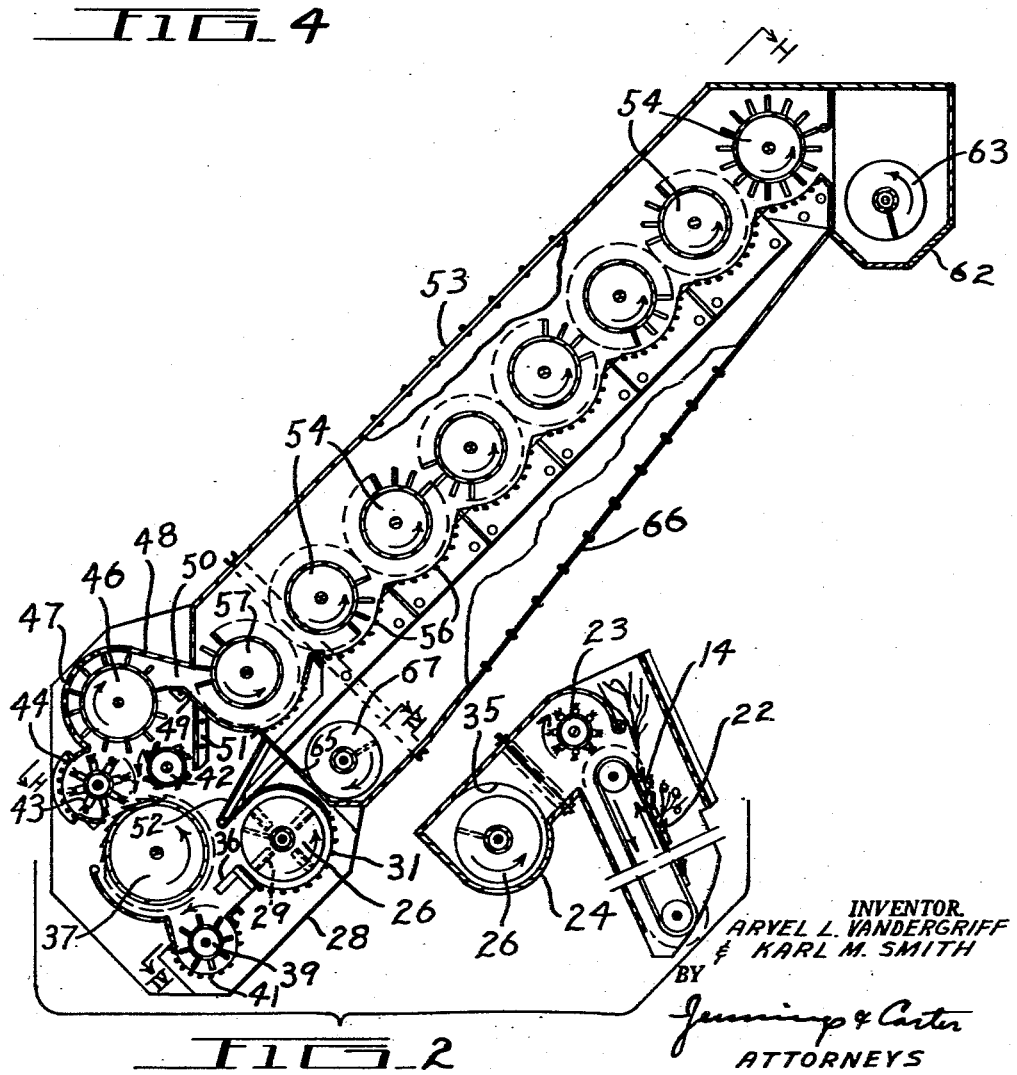

United States Patent Office 2,795,011
Patented June 11, 1957

2,795,011

APPARATUS FOR EXTRACTING STICKS, STEMS, BURRS AND OTHER TRASH FROM SEED COTTON

Arvel L. Vandergriff and Karl M. Smith, Columbus, Ga., assignors to Lummus Cotton Gin Company, a corporation of Georgia Application January 19, 1955, Serial No. 482,791

11 Claims. (Cl. 19—67)

This invention relates to apparatus for cleaning rough harvested seed cotton such as that removed from the stalks by cotton stripping apparatus. Such cotton, as is well known, contains leaves, sticks, stems, opened and unopened bolls, dirt and even stones which may be picked up by the stripping apparatus. In fact it contains so much foreign matter that it cannot be handled by cotton gins as they are today constructed. It is accordingly the principal object of our invention to provide apparatus which shall be effective to separate the major portion of such foreign materials from the cotton whereby it may then be handled by the usual ginning machinery.

A further object of our invention is to provide cleaning apparatus which shall be capable of being associated with cotton stripping apparatus and thereby separate foreign materials from the cotton directly as it is stripped.

A more specific object of our invention is to provide cleaning apparatus which shall include one or more elevating aprons constructed and arranged to separate and discharge a large portion of the longer sticks and stems accompanying the cotton, followed by means for subjecting the cotton to successive picking and screening operations, all within a relatively small confined space, to separate and discharge trash, leaves, burrs, stems and other foreign materials.

While not necessarily associated directly therewith our improved apparatus is especially adapted for use with cotton stripping apparatus which gathers sticks, stems, unopened balls of cotton and other trash along with opened cotton. Our apparatus embodies a downwardly inclined housing open at bottom and top in which are mounted a pair of spiked aprons to which cotton is delivered. The aprons are provided with upwardly inclined spikes on their upgoing sides which engage the cotton and trash and align many of the longer sticks which are carried up and discharged out of the open top of the housing. A counterbalanced plate at the bottom of the apron serves as a trap to catch and discharge rocks and other heavy particles. The cotton and trash is next conveyed to an extractor unit where it is fed onto the upgoing side of a saw cylinder, having a reclaiming picker roller mounted below it and a stripper roller to knock back burrs and sticks clinging to the cotton on the saw cylinder. The trash passing to the reclaiming picker roller is tossed thereby against the saw cylinder, repeatedly, whereby substantially all cotton is removed therefrom and the trash is finally discharged from the reclaiming roller. Cotton and remaining trash is doffed from the saw cylinder and is delivered to the lowest of a series of upwardly inclined spiked rollers which convey the cotton over screens comprised of spaced axially extending bars providing elongated openings through which another portion of the sticks, stems and other trash are caused to pass. The cleaned cotton is delivered from the upper end of the series of spiked rollers and the trash passing through the screens is delivered to the reclaiming picker roller for further separation of cotton therefrom.

Apparatus embodying features of our invention is illustrated in the accompanying drawings forming a part of this application in which:

Fig. 1 is a plan view with parts broken away and in section looking in the direction of the arrows I—I in Fig. 2;

Fig. 2 is a longitudinal sectional view with the means for elevating and feeding the cotton shown separated from the main portion of the apparatus;

Fig. 3 is a detail sectional view of the elevating and feeding means;

Fig. 4 is a sectional view taken along the line IV—IV of Fig. 2; and

Fig. 5 is a detail sectional plan view of a spiked feed roller.

Referring to the drawings for a better understanding of our invention, we show diagrammatically at 10 and 11, two conveyers for feeding cotton to the apparatus, which conveyers may form part of a well known form of cotton stripping machine which forms no part of our present invention, but which may or may not be associated directly with our improved cleaning apparatus. At 12 and 13 we show two downwardly inclined housings in each of which is mounted an apron 14 which receives cotton from its associated conveyer 10 or 11. The housings 12 and 13 are each open at the top and bottom as indicated by the numerals 16 and 17. The opening at the bottom extends up for a considerable distance from the bottom in front, whereby to receive cotton from the conveyers. Mounted at the ends of the conveyers 10 and 11 are plates 18 which are pivoted to the sides of the conveyers as at 19 and are each counterbalanced by means of a weighted arm 21 whereby to maintain a position closely adjacent the lower end of the housings 12 and 13. When heavy articles such as stones, or green cotton bolls are delivered by the conveyers 10 and 11 they will overbalance the weight and be discharged on the ground. Each of the aprons 14 is provided with upwardly inclined spikes 22 on its upgoing side which engage the cotton and trash to convey it upwardly in the casing. By means of the spikes 22 cotton stalks and other long sticks are caused to align with the apron and may be lifted up and discharged out of the top as indicated in Fig. 2 of the drawing.

Mounted in each of the casings above the upper ends of the apron 14 is a doffing brush 23 which rotates in the direction indicated by the arrow to remove cotton from the spikes of the apron and discharge it into a conveyer trough 24 having a screw conveyer 26 mounted therein. Mounted over each of the doffing brushes 23 is a shield 27 which prevents cotton being thrown out of the casing by the doffing brush. The conveyer trough 24 extends across both housings 12 and 13 and receives cotton therefrom and is joined at the side of a housing 28 to an extracting unit which will now be described.

The conveyer 26 extends across the housing 28 and within the housing it is provided with radial plates 29 secured to the flights of the conveyer which act to toss the cotton out of the conveyer trough as it is being conveyed along. Inside the casing 28, the trough for the conveyer 26 is comprised of elongated, spaced rods 31 which constitute a grid screen through which trash and dirt may pass as the cotton is being conveyed across the housing and being tossed out. At the inner end of the conveyer 26, within the housing 28, is a passage for trash 32 and a radial blade 33 is formed or mounted on the inner end of the shaft 34 of the conveyer to move the cotton and trash which has not been tossed out of the conveyer trough downwardly along the side of the housing 28.

The cotton tossed out of the trough of the conveyer is thrown against the upgoing side of a saw cylinder 37, which latter is rotating in the direction indicated by the arrow. A curved baffle member 35 extends across the screw conveyer 26 within the casing 28 to guide the cotton and trash leaving the conveyer onto the saw. Foreign matter and cotton which do not adhere to the saw may be thrown onto a hull board 36. Cotton hulls, sticks and other trash not adhering to the saw 37 may pass between the lower edge of the hull board 36 and the saw cylinder 37 and fall downwardly onto a spiked picker roller 39 which is rotating in the direction indicated by the arrow over a grid screen 41. The screen 41 is formed of elongated, spaced rods extending across the housing and defining between them elongated passages through which hulls, and other trash may pass. The bottom of the housing 28, as shown, is open so that trash passing through the screens is discharged onto the ground.

Mounted above the saw cylinder 37 is a stripper roller 42 which is in closely spaced relation to the saw cylinder whereby to knock back hulls and sticks clinging to the cotton and being carried around by the saw cylinder. Also, mounted above the saw cylinder 37, alongside the stripper roller 42, is a rotating doffer brush 43 which is rotating in the direction indicated by the arrow to remove cotton from the saw cylinder 37 and carry it upwardly over a grid screen 44 similar to screen 41 under the picker roller 39. Mounted above the doffing brush 43 is a spiked feed roller 46 which rotates in the direction indicated by the arrow and which receives cotton from the doffing brush 43 and carries it upwardly and around over a perforated screen 47. Adjacent the screen 47 is a baffle member 48 which extends tangentially and horizontally with respect to the feed roller 46 and which guides cotton thrown off the feed roller 46 into a passage 50 formed by the baffle member 48 and a second baffle member 49 extending across the housing 28. Any trash or cotton failing to enter the passage just described passes downwardly and is engaged by the stripper roller 42 which tosses it back to the spiked roller 46 or against the brush 43 and thence to the roller 46. A vertically disposed baffle member 51 acts to prevent material stripped back by the roller 42 from entering passage 50. A second downwardly inclined baffle member 52 extends across the housing adjacent the saw cylinder 37 to direct material stripped back by the roller 42 against the saw cylinder. As this material is reapplied to the saw cylinder 37 the cotton is retained by the saw teeth while foreign matter is kicked back over the hull board 36 into the conveyer 26, or if in small enough particles passes between the lower edge of the hull board 36 and the saw 37 as already described.

Joined to the housing 28 and extending upwardly therefrom is a somewhat narrower housing 53. Mounted in the casing 53 are a series of spiked cleaning rollers 54, seven in number being shown in the drawing although any suitable number may be employed. Each of the cleaning rollers rotates over a grid bar screen 56 formed of spaced bars extending across the housing and forming elongated passages therebetween. Mounted in the casing 28, in advance or adjacent the casing 53 is a feed roller 57 which receives cotton from the passage 50. The feed roller 57 is provided with radial spikes 58 intermediate its ends and inclined rows of spikes 59 and 61 at its ends, as shown in Fig. 5, which draw the cotton and trash leaving the feed roller 46 inwardly to discharge it into the narrower casing 53. Feed roller 57 discharges the cotton onto the lowermost roller 54 which draws it under and pulls it over the screen 56 with a rubbing action, delivering it to the next adjacent roller 54 and thence to the uppermost roller 54 which discharges the cleaned cotton into a screw conveyer trough 62 having a screw conveyer 63 therein which discharges the cotton from the apparatus at 64 into any suitable receptacle, not shown.

As the cotton is pulled over the grid screen 56, hulls, stems, leaves and other trash are caused to pass between the bars forming the screen and falls downwardly onto the bottom 66 of the housing 53. The trash thus falling on the bottom, together with clinging cotton, slides down the smooth bottom 66 to a screw conveyer 67 which is rotating in the direction indicated by the arrow to convey the trash and cotton across the housing to the trash passage 32. A radial blade 68 on the end of the conveyer 67 discharges the trash thus conveyed into the trash passage 32 already described. Extending across the housing 28, below the screw conveyer 67 is a partition 65 which prevents trash from being thrown into the trough of the conveyer 26 and thus causes all the trash to be conveyed to the trash passage 32.

As shown in Fig. 4, the picker roller 39 is provided on its end adjacent the trash passage 32 with a short conveyer flight 69 which moves the trash inwardly of the casing under the saw cylinder 37 where it is engaged by the spiral rows of spikes 71 on the picker roller which toss the trash and clinging cotton upwardly against the saw cylinder 37, repeatedly, so that the remaining cotton in the trash is engaged by the teeth of the saw and thus reclaimed. As the trash is tossed upwardly, it is caused to move across the housing 28 by reason of the spiral rows of spikes and is discharged from an outlet 70 extending outwardly of the housing 28. A radial blade 72 on the outer end of the picker roller aids in ejecting the trash.

From the foregoing description the operation of our improved apparatus will be readily understood. Stripped cotton, containing stems, sticks, burrs and other trash, as well as open cotton, is conveyed to the aprons 14 within the casings 12 and 13 by the conveyers 10 and 11. It is there engaged by the upwardly inclined teeth 22 of the aprons and is conveyed upwardly, a great many of the stalks and longer sticks being engaged by the teeth and thrown out at the upper open ends 16 of the housings 12 and 13. The cotton raised upward by the aprons is doffed by means of the doffing brushes 23 and delivered into the conveyer trough 24 which conveys the cotton across and into the housing 28. The cotton and trash is then further conveyed by the conveyer 26 over the grid screen 31, at the same time being engaged by the blades 29 on the conveyer flights and tossed out of the conveyer and onto the reclaiming saw 37. The hulls and trash not adhering to the saw are tossed onto the hull board 36 or into the conveyer 26 and are again delivered by the hull board 36 against the upgoing side of the reclaiming saw 37. Cotton adhering to the saw 37 is carried upwardly to be doffed by means of the doffing brush 43 which, rotating in the direction indicated by the arrow, carries the cotton upwardly over the grid screen 44 and delivers it to the feed roller 46. Cotton and hulls passing the hull board 36 fall onto the spiked picker roller 39 which tosses the trash with clinging cotton repeatedly up against the saw cylinder 37 where it is engaged by the saw teeth and thus reclaimed.

Cotton delivered to the feed roller 46 is carried over the curved perforated screen 47 and is discharged downwardly through the passage 50 to the spiked roller 57 which, with its inclined rows of spikes at the ends draws the stream of cotton inwardly at the ends and delivers it into the narrower housing 53 under the lowermost spiked cleaning roller 54. The cotton is carried under the series of spiked cleaning rollers 54 over the grid bar screens 56 with a rubbing action which causes the trash to be separated from the cotton and fall through the elongated passages between the grid bars. After passing under all of the cleaning rollers, as described, it is discharged by the uppermost cleaning roller 54 into the conveyer trough 62 and is finally discharged from the apparatus at 64.

Trash passing through the screens 56 falls onto the smooth bottom 66 of the housing 53 and slides downwardly to be engaged by the screw conveyer 67 and delivered into the lateral trash passage 32 and moves from thence down said passage to the spiked picker roller 39 for retreatment as already described; the trash being finally discharged from the housing 28 at 70.

From the foregoing it will be apparent that we have devised an improved apparatus for separating sticks, stems, burrs, and other trash from seed cotton as it is stripped from the stalk. It will further be apparent that our improved apparatus may be employed separately or be mounted directly on and moving with cotton stripping apparatus and thereby clean the cotton as it is being removed from the stalk.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The combination with cotton stripping apparatus, of a cleaning and hull extracting apparatus comprising an upwardly inclined casing having an opening at each end, an apron in the casing disposed to receive cotton at the lower end of the casing and raise it to the upper end, a doffing brush disposed to remove cotton from the upper end of the apron, a horizontally disposed rotating saw cylinder in the casing laterally disposed with respect to the apron, a conveyer disposed to receive cotton from the doffing brush and deliver it to the upgoing side of the saw cylinder, a second doffing brush mounted above the saw cylinder to remove cotton therefrom, an upwardly inclined series of horizontally disposed spiked rollers disposed to receive cotton from the second mentioned doffing brush and convey it upwardly through the series, a screen under each roller, the rollers rotating in a direction to pull cotton over the screens, a conveyer trough mounted under the saw cylinder, a slide under the series of rollers to deliver hulls and trash passing through the screens to the conveyer trough, a spiked roller in the trough disposed to throw hulls and trash up against the saw cylinder to separate cotton therefrom, means to deliver hulls and trash from the lower end of the casing, and means to deliver cleaned cotton from the upper end thereof.

2. Apparatus as defined in claim 1 in which the apron is provided with upwardly inclined spikes on its upgoing side disposed to engage and align large sticks delivered to it, with the cotton and discharge them from the upper end of the apron casing.

3. Apparatus as defined in claim 1 in which cotton is fed into the lower end of the apron casing onto a pivotally mounted counterbalanced plate for the discharge of stones and other heavy material therefrom.

4. Apparatus as defined in claim 1 in which the spiked roller in the conveyer trough is provided with spiral rows of spikes and in which the trash passing through the screens is conveyed to one end of the conveyer trough to be moved to the other end by the spiked roller and discharged.

5. Apparatus as defined in claim 1 in which the apron is divided to receive and elevate two streams of cotton and trash from the stripping apparatus.

6. In apparatus for extracting sticks, stones and other foreign material from seed cotton as it is gathered in the field, a downwardly inclined housing open at the bottom and the top, means to deliver cotton to be cleaned to the lower part of the housing, a spiked driven apron mounted in the housing with its upgoing side disposed to receive the cotton being fed into the apparatus, a horizontally disposed rotating saw cylinder, means to deliver cotton from the apron to the upgoing side of the saw cylinder, a hull board disposed to direct the cotton against the saw cylinder, a stripper roller adjacent the saw cylinder in position to knock hulls and sticks back off the saw cylinder, a spiked rotating reclaiming cylinder below the saw cylinder in position to receive hulls and sticks passing the hull board, a doffing brush disposed above the saw cylinder to remove cotton therefrom, a screen alongside the doffing brush, and an upwardly inclined series of horizontally disposed spiked cleaning cylinders disposed to deliver cotton successively from one to the other and for the lowest in said series to receive cotton from the doffing brush and for the uppermost to deliver cleaned cotton therefrom, screens under all the cleaning cylinders in said series, means to return foreign matter passing through said screens to the reclaiming cylinder, and means to discharge trash from the reclaiming cylinder.

7. The combination with a seed cotton hull extractor including a casing having mounted therein a saw cylinder, a hull and trash ejecting means, and a spiked reclaiming cylinder disposed under the saw cylinder to reclaim cotton from the hulls and trash, of means to feed cotton to be cleaned onto the upgoing side of the saw cylinder, a doffing brush mounted over the saw cylinder in position to remove cotton therefrom and move it upwardly, a series of horizontally disposed spiked rollers mounted in the casing in an upwardly inclined row to move the cotton from the doffing brush to the upper end of the series, a screen under each spiked roller, means to return trash passing through the screens to the spiked reclaiming cylinder, and means to deliver cleaned cotton from the upper end of the series.

8. Apparatus as defined in claim 7 in which the screens are in the form of axially extending spaced grid bars and in which the spiked rollers are rotated in a direction to pull the cotton over the screens with a rubbing action.

9. The combination with a cotton stripping machine, of a vertically inclined apron having upwardly inclined spikes on its upgoing side, a housing for the apron having an opening at the top for the discharge of sticks, a hull extracting unit, means to doff cotton from the apron, means to deliver the doffed cotton from the apron to the hull extracting unit, a cleaning unit comprised of an upwardly inclined series of horizontally disposed spiked rollers each having a screen associated therewith, means to deliver cotton from the hull extracting unit to the lowermost roller of the cleaning unit, a reclaiming cylinder associated with the hull extracting unit, means to return trash passing through the screens to the reclaiming cylinder, and means to deliver cleaned cotton from the uppermost spiked cleaning cylinder.

10. In cotton cleaning apparatus, a downwardly inclined housing open at bottom and top, means to feed cotton to be cleaned into the front lower end of the housing, a spiked apron mounted lengthwise in the housing and having upwardly inclined spikes on its upgoing side at the front to engage and elevate the cotton and sticks and discharge sticks at the upper end of the housing, a horizontally disposed rotating saw cylinder, means to remove cotton from the apron, means to discharge it against the upgoing side of the saw cylinder, a stripper roller and spiked reclaiming cylinder associated with the saw cylinder, means to doff cotton from the upper side of the saw cylinder and discharge it onto an upper spiked cleaning roller, and a series of spiked rollers upwardly inclined through which the cotton is successively passed to clean it.

11. The combination with cotton stripping apparatus, of a cleaning and hull extracting apparatus comprising an upwardly inclined casing having an opening at each end, an apron in the casing disposed to receive cotton at the lower end of the casing and raise it to the upper end, a doffing brush disposed to remove cotton from the upper end of the apron, a horizontally disposed rotating saw cylinder in the casing laterally disposed with respect to the apron, a screw conveyer disposed to receive cotton and trash from the doffing brush and move it laterally alongside the saw cylinder, radial blades on the conveyer opposite the saw cylinder for tossing the cotton and trash out of the conveyer, a curved baffle member over the conveyer trough disposed to direct cotton and trash against the upgoing side of the saw cylinder, a second doffing brush mounted over the saw cylinder to remove cotton therefrom, a series of spiked rollers each having a screen associated therewith disposed to receive cotton from the second mentioned doffing brush and convey it over the screens, and means to deliver cleaned cotton and hulls and trash separately from the casing.

References Cited in the file of this patent

UNITED STATES PATENTS

| | | |
|---|---|---|
| 1,680,712 | Wilson | Aug. 14, 1928 |
| 1,990,816 | Conrad | Feb. 12, 1935 |
| 2,123,405 | Court | July 12, 1938 |
| 2,421,483 | Deems et al. | June 3, 1947 |
| 2,668,989 | Vandergriff | Feb. 16, 1954 |